United States Patent [19]

Bete

[11] 4,378,585
[45] Mar. 29, 1983

[54] FREE-RUNNING BLOCKING OSCILLATOR-TYPE CONVERTER

[75] Inventor: Manfred Bete, Erlangen, Fed. Rep. of Germany

[73] Assignee: Siemens Aktiengesellschaft, Munich, Fed. Rep. of Germany

[21] Appl. No.: 233,695

[22] Filed: Feb. 12, 1981

[30] Foreign Application Priority Data

Feb. 28, 1980 [DE] Fed. Rep. of Germany ....... 3007566

[51] Int. Cl.$^3$ ............................................ H02M 3/335
[52] U.S. Cl. ...................................... 363/19; 323/902; 331/112
[58] Field of Search .................................... 363/18–21, 363/97, 124, 131; 331/112, 146, 148, 149; 323/282, 284, 285, 288, 902

[56] References Cited

U.S. PATENT DOCUMENTS

| | | | |
|---|---|---|---|
| 3,327,202 | 6/1967 | Mills | 323/288 |
| 3,911,352 | 10/1975 | Slack | 321/14 |
| 4,005,351 | 1/1977 | Blum | 363/21 X |
| 4,079,436 | 3/1978 | Brown | 361/56 X |
| 4,316,242 | 2/1982 | Colangelo et al. | 363/21 |

FOREIGN PATENT DOCUMENTS

| | | | |
|---|---|---|---|
| 2457664 | 10/1976 | Fed. Rep. of Germany | |
| 52-60929 | 5/1977 | Japan | 363/19 |
| 55-34730 | 3/1980 | Japan | 363/19 |
| 1152295 | 5/1969 | United Kingdom | 363/19 |

OTHER PUBLICATIONS

"Transistor–Gleichspannungswandler", von Helmut Schweitzer, 1969, p. 34.

*Primary Examiner*—William M. Shoop
*Assistant Examiner*—Peter S. Wong
*Attorney, Agent, or Firm*—Kenyon & Kenyon

[57] ABSTRACT

A free-running blocking oscillator-type converter for producing a controlled output signal. The converter is provided with a primary winding of a transformer, a switching transistor, and a resistor which are connected in series with one another between first and second input terminals of the converter. The transformer is further provided with a feedback winding which is coupled to the base terminal of the switching transistor. In some embodiments, optoelectronic coupling devices are used in a sensor arrangement for providing a control signal responsive to variations in the magnitude of the output signal of the converter. In other embodiments, such variations in the output signal of the converter are sensed by a transformer winding. Circuitry is disclosed for applying the sensor control signal selectably to the base and emitter terminals of the switching transistor.

7 Claims, 4 Drawing Figures

FREE-RUNNING BLOCKING OSCILLATOR-TYPE CONVERTER

BACKGROUND OF THE INVENTION

This invention relates to oscillator-type converters, and more particularly, to a free-running blocking oscillator-type converter which utilizes transformer feedback windings for controlling the conduction state of a switching transistor.

The reference *Transistor-Gleichspannungswandler* (Transistor dc Converters), by Helmut Schweitzer, 1969, page 34, teaches a free-running blocking oscillator-type converter which contains a switching transistor and a primary winding of a transformer connected in series across a pair of input terminals. The transformer is provided with a secondary winding which is connected by means of a rectifier and a smoothing filter to output terminals. A feedback winding is further provided in the transformer, and is connected at a first end to the base terminal of the switching transistor. The emitter terminal of the switching transistor is coupled directly to a reference potential, and the second end of the feedback winding is coupled to a terminal of a voltage divider at the input of the circuit. This feedback arrangement results in in an oscillation characteristic which is a function of the dynamic characteristics of the switching transistor. The reference does not teach the manner in which the output voltage of the blocking oscillator-type converter described therein would be controlled. The nonlinear characteristics of the switching transistor render the output voltage difficult to control by varying the bias at the base terminal.

Several possible arrangements for controlling switching power supplies are described in an article entitled "The Control of Switching Power Supplies" by R. Ranfft, in the lecture series "Switching Power Supplies", published by VALVO, in November, 1976. As disclosed therein, a series circuit consisting of an auxiliary transistor and a primary winding of a measuring transformer is disposed, for example, on the output side of a blocking oscillator-type converter. In this circuit, the auxiliary transistor is in a conductive state simultaneously with the switching transistor. The secondary winding of the measuring transformer is coupled to a series combination of a Zener diode and a voltage divider. The output voltage is compared with the Zener voltage, which serves as a reference potential. A controlled voltage, which is dc isolated from the output circuit, is available at a tap of the voltage divider. The article notes that dc isolation may be achieved by the use of optical couplers. However, the article does not describe the manner in which the switching transistor may be influenced by the control voltage.

It is, therefore, an object of this invention to provide a free-running blocking oscillator-type converter, the output voltage of which can be controlled in response to variations in the base-emitter of the switching transistor.

SUMMARY OF THE INVENTION

The foregoing and other objects are achieved by this invention which provides a free-running blocking oscillator-type converter having a switching transistor and a primary winding of a transformer in series across first and second input terminals. A secondary winding of the transformer is coupled to first and second output terminals by means of a rectifier and a smoothing filter. The transformer is further provided with a feedback winding which is coupled at one end to a base terminal of the switching transistor, and at its other end to a reference potential. A series combination of a resistor, a diode, and a capacitor is arranged between the first and second input terminals, the base terminal of the switching transistor being connected to a first node where the diode and the resistor are connected to one another. A second node, where the diode and capacitor are connected to one another, is further connected to a sensor which detects a control voltage deviation and provides a responsive signal which influences the base bias of the switching transistor.

In an alternative embodiment, a capacitor, a resistor, and a control transistor are connected in parallel and connected between the switching transistor and the second input terminal. In both embodiments, a resistor is disposed in the switching path of the switching transistor. The switching point of the switching transistor is reached when the voltage at its base equals the emitter voltage. Thus, the switching point is independent of a family of nonlinear transistor characteristics. In the first embodiment, the switching point, and consequently the output voltage, are controlled by varying the base bias of the switching transistor. In the second embodiment, however, control is achieved by varying the emitter voltage. In both embodiments, control is simply achieved in a manner which is largely independent of the characteristics of the particular switching transistor.

An illustrative sensor circuit may consist of a series combination of a Zener diode and a light-emitting diode of an optoelectronic coupling device between the output terminals of the converter circuit. The output signal of the sensor circuit is provided at the collector and emitter terminals of the phototransistor of the optoelectronic coupling device. The Zener voltage across the Zener diode serves as a reference potential for the output voltage of the converter circuit. Variations in the output voltage are optically isolated from the dc component of the output of the converter circuit, by operation of the optoelectronic coupling device, the voltage variations being conducted to the input of the converter circuit.

In an alternative embodiment, the sensor circuit is provided with a measuring winding in the transformer, the winding being shunted by the series combination of a diode, a Zener diode, and a resistor. An auxiliary transistor is connected at its base to the node of the Zener diode and the resistor in the series combination. The output signal of the sensor circuit is obtained across the collector and emitter terminals of the auxiliary transistor. Such a separate measuring winding assures that dc isolation is maintained between the input and output circuits of the converter circuit.

A resistor may be shunted across the above-mentioned capacitor which forms a portion of the series circuit across the input terminals of the converter cirucit. Such a resistor permits the capacitor to discharge so that, for example, the capacitor will be discharged when the converter circuit is first activated.

In further embodiments, the control sensitivity of the overall circuit may be improved by providing amplifier circuitry between the output of the sensor circuit and the input circuit of the converter circuit. In addition, a Zener diode may be arranged between the base terminal of the switching transistor and the reference potential of the converter circuits. Such a Zener diode provides overload protection by limiting the voltage at the base terminal of the switching transistor, and thereby limiting the power transmitted by the blocking oscillator-type converter.

BRIEF DESCRIPTION OF THE DRAWINGS

Comprehension of the invention is facilitated by reading the following detailed description in conjunction with the annexed drawings, in which.

DETAILED DESCRIPTION

Figure 1:
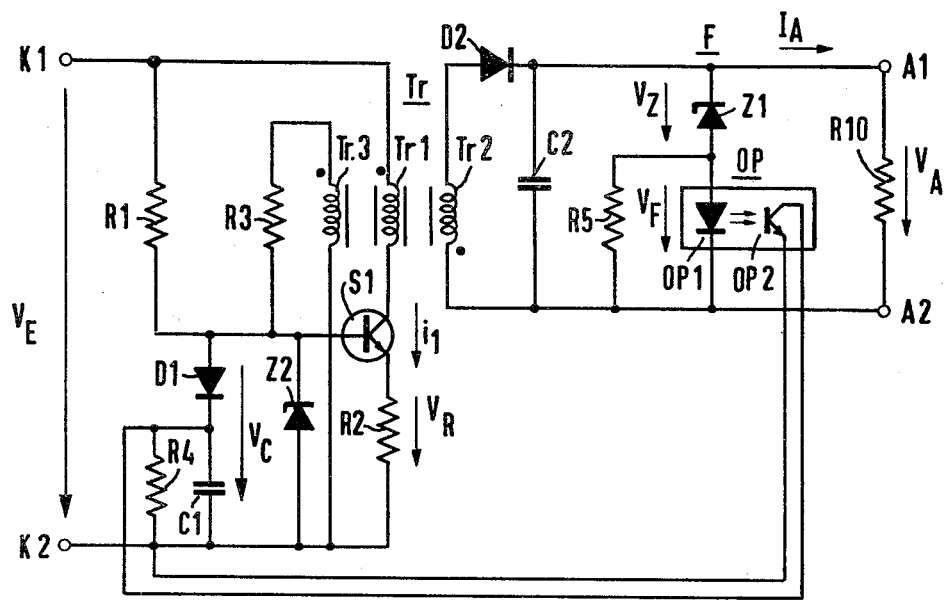
FIG. 1 is a schematic representation of an embodiment of the invention which utilizes optoelectronic isolation in the sensor circuit.

FIG. 1 schematically illustrates a free-running blocking oscillator-type converter which is constructed in accordance with the principles of the invention and contains a series circuit consisting of a primary winding Tr1 of a transformer Tr, a switching transistor S1, and a resistor R2 disposed between input terminals K1 and K2. Transformer Tr is provided with a feedback winding Tr3 which is coupled at one end to a base terminal of switching transistor S1 by means of a resistor R3. The other end of feedback winding Tr3 is connected to input terminal K2. Switching transistor S1 receives additional base current from input terminal K1 by means of a resistor R1. The voltage at the base of the switching transistor is limited by a Zener diode Z2. A secondary winding Tr2 of transformer Tr is connected at one end to an output terminal A1 by means of a diode D2, and at its other end directly to an other output terminal A2. A capacitor C2 is provided across output terminals A1 and A2 so as to smoothen the output voltage thereacross, $V_A$.

The blocking oscillator-type converter shown in FIG. 1 operates during one oscillation period as follows:

Initially, it is assumed that switching transistor S1 is in a conductive state and is supplied with base current from input terminal K1, by means of resistor R1. As a result of the inductive effect of primary winding Tr1, the collector-emitter current, $i_1$, which flows through switching transistor S1, increases substantially linearly. At such time as collector-emitter current $i_1$ has increased to the point that voltage drop $V_R$ across resistor R2 equals a voltage $V_C$, across the base terminal of the switching transistor and the reference potential at input terminal K2, the base-emitter voltage of the switching transistor will become zero so that the switching transistor will enter a nonconductive state. This causes voltage across secondary winding Tr2 to reverse so that diode D2 on the secondary side of transformer Tr is now poled for conduction, and the magnetic energy which is stored in transformer Tr is transferred to the output circuit by means of secondary winding Tr2. During this time, the base-emitter voltage of switching transistor S1 is kept negative by the voltage in feedback winding Tr3, by means of resistor R3. When the magnetic energy in the transformer has been transferred, the voltage across feedback winding Tr3 also becomes zero, thereby permitting switching transistor S1 to receive a small base current from input terminal K1, by means of resistor R1, so that the switching transistor enters a conductive state once again.

The power $P_A$ which is delivered to the output circuit by secondary winding Tr2 may be expressed mathematically as:

$$P_A = \frac{L_1}{2} \times I_{1M}^2 \times f \times \zeta$$

where:

$L_1$ is the inductance of winding Tr1;
$I_{1M}$ is the maximum current through winding Tr1;
f is the switching frequency of the converter; and
$\zeta$ is the efficiency of the converter. Therefore, the output voltage is:

$$V_A = \frac{1}{2I_A} \times L_1 \left(\frac{V_C}{R2}\right)^2 \times f \times \zeta$$

where R2 is the resistance of resistor R2 in the emitter circuit.

As this equation shows, output voltage $V_A$ is a function of output current $I_A$. Such dependence, however, can be eliminated by modifying voltage $V_C$, which is across the base terminal of switching transistor S1 and the reference potential at input terminal K2, in response to variations in the output of current $I_A$. Such control is achieved as follows:

Deviations in the magnitude of output current $I_A$ are detected by the series combination of a Zener diode Z1, and a diode OP1 in an optical coupler OP. These diodes are connected across output terminals A1 and A2. A resistor R5 is connected across diode OP1, the sensitivity of the control arrangement being dependent upon the resistance of resistor of R5. The control arrangement further consists of the serial combination of a diode D1 and a capacitor C1 which are arranged in shunt across Zener diode Z2 between the base terminal of switching transistor S1 and input terminal K2. Capacitor C1 is shunted by a resistor R4 which is further shunted by the collector-emitter path of phototransistor OP2 in photocoupler OP.

In operation, capacitor C1 is charged during a storing period of switching transistor S1, by means of resistors R1 and R3. When output voltage $V_A$ surpasses the Zener voltage of Zener diode Z1, current is conducted through diode OP1, which emits light and thereby causes the resistance of transistor of OP2 to decrease. Such conduction causes the charge on capacitor C1 and voltage $V_C$ to decrease. Thus, the moment of cutoff of switching transistor S1, which is reached when emitter voltage $V_R$ equals base voltage $V_C$, is reached at a lower value for current $i_1$, thereby reducing the value of output voltage $V_A$. Conversely, if the value of output voltage $V_A$ does not exceed the Zener voltage of Zener diode Z1, light emitting diode OP1 will not conduct, thereby maintaining the resistance of phototransistor OP2 high. Consequently, base voltage $V_C$ will remain relatively high, thereby requiring collector-emitter current $i_l$ to reach a relatively high value before switching transistor S1 enters a nonconductive state.

Figure 2:
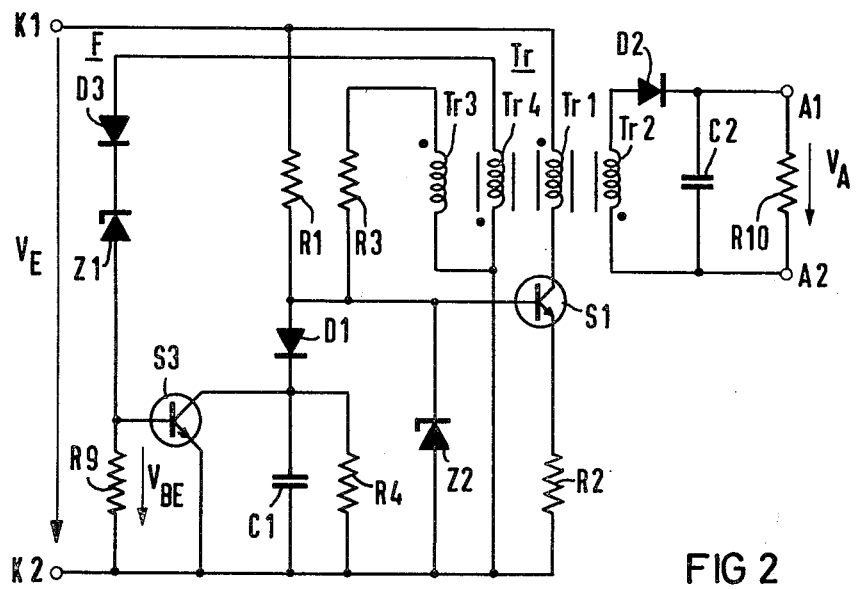
FIG. 2 is a schematic representation of an embodiment of the invention which utilizes a measuring winding in a transformer for dc isolating the output circuit.

FIG. 2 shows an embodiment of the invention which utilizes a transformer winding Tr4 to detect deviations in output voltage $V_A$, while maintaining dc isolation between the input and output circuits of the converter. Measuring winding Tr4 is connected at one end directly to the reference potential at input terminal K2. The other end of the measuring winding is also connected to the reference potential by the series combination of a diode D3, a Zener diode Z1 and a resistor R9. As previously described with respect to the embodiment of FIG. 1, the base terminal of switching transistor S1 is connected to the reference potential by the series combination of a diode D1 and a capacitor C1. Capacitor C1 is shunted by an auxiliary transistor S3 which is coupled at its base terminal to the junction of resistor R9 and the anode terminal of Zener diode Z1. Thus, the sensor circuit in this embodiment consists of measuring winding Tr4, diode D3, Zener diode Z1, resistor R9, and auxiliary transistor S3. In all other respects, the embodiment of FIG. 2 operates in the same manner as the embodiment of FIG. 1. Thus, circuit elements in the embodiment of FIG. 2 which are functionally analogous to circuit components in the embodiment of FIG. 1, are identified with the same reference symbols.

As soon as the voltage across measuring winding Tr4 exceeds the Zener voltage of Zener diode Z1, current begins to flow through diode D3, Zener diode Z1, and resistor R9, thereby causing a voltage drop across resistor R9. Such conduction causes the base terminal of auxiliary transistor S3 to become positive, thereby causing auxiliary transistor S3 to conduct and reduce the charge of capacitor of C1. As described hereinabove with respect to the embodiment of FIG. 1, the reduction of the charge of capacitor C1 shortens the conductive time of switching transistor S1 thereby reducing the value of output voltage $V_A$.

Figure 3:
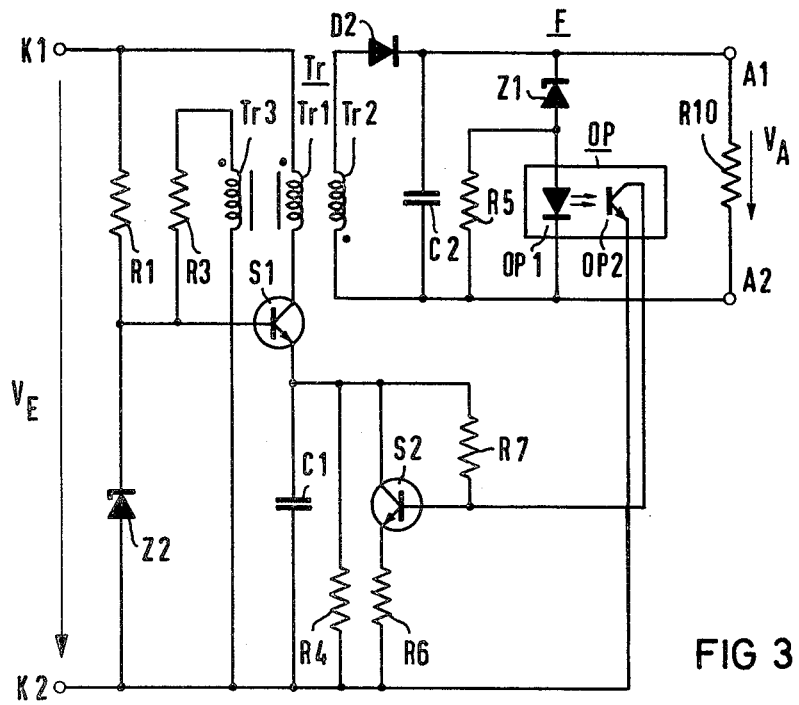
FIG. 3 is a schematic representation of an embodiment of the invention which utilizes optoelectronic isolation between the input and output circuits, and a controlled transistor.
Figure 4:
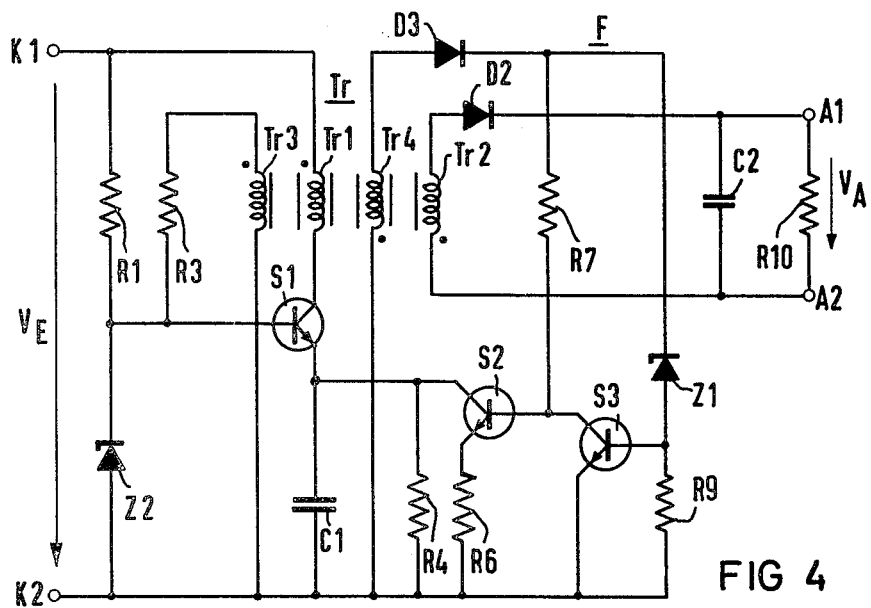
FIG. 4 is a schematic representation of an embodiment of the invention which utilizes transformer isolation between the input and output circuits, and control and auxiliary transistors.

In the illustrative embodiments of FIGS. 3 and 4, the blocking oscillator-type converter is controlled by varying the voltage of the emitter of the switching transistor, and not the base voltage, as is the case in the embodiments of FIGS. 1 and 2. However, such variations in the emitter voltage cause consequent variations in the base-emitter voltage.

FIG. 3 shows an embodiment of the invention which, as previously described, is provided with switching transistor S1 which receives base current from input terminal K1 by means of resistor R1. The voltage at the base terminal of switching transistor S1 is limited by Zener diode Z2. Feedback is produced by the operation of feedback winding Tr3 and resistor R3 which is connected to the base terminal of switching transistor S1. The emitter terminal of switching transistor S1 is connected to second input terminal K2 by the parallel combination of capacitor C1, resistor R4, and the series combination of a control transistor S2 and resistor R6. As previously described with respect to the embodiment of FIG. 1, a series circuit consisting of a Zener diode Z1 and an optoelectronic coupling device OP is provided in the output circuit of the converter to operate as a sensor. Transistor OP2 of optoelectronic coupling device OP is connected to the base of control transistor S2, and to the reference potential at input terminal K2. A resistor R7 is disposed across the collector and base terminals of control transistor S2.

When the magnitude of the output voltage $V_A$ surpasses the magnitude of the Zener voltage of diode Z1, phototransistor OP2 becomes conductive. Such conductivity reduces the voltage at the base terminal of control transistor S2, thereby causing the control transistor to enter a nonconductive state. With control transistor S2 nonconductive, capacitor C1 charges to a higher potential thereby reducing the voltage across the base and emitter terminals of switching transistor S1. Such an increase in the emitter voltage of the switching transistor causes the duty cycle of the switching transistor to vary in the manner described hereinabove with respect to the embodiments of FIGS. 1 and 2, and thereby control the output voltage $V_A$.

FIG. 4 shows a schematic representation of an embodiment of the invention which controls its output voltage by varying the voltage at the emitter of the switching transistor, the variations in the output voltage being sensed by a measuring winding Tr4. Measuring winding Tr4 is connected at one end to the reference potential at input terminal K2, and at its other end to the same reference potential by means of a diode D3, a Zener diode Z1, and a resistor R9. An auxiliary transistor S3 is connected at its emitter to the reference potential at input terminal K2, and at its base terminal to the junction of resistor R9 and the anode of Zener diode Z1. The collector of auxiliary transistor S3 is connected to the junction of the cathodes of diode D3 and Zener diode Z1, and to the base terminal of a control transistor S2. As previously described with respect to the embodiment of FIG. 3, the emitter of switching transistor S1 is connected to the reference potential by the parallel combination of a capacitor C1, a resistor R4, and the series combination of the collector-emitter path of control transistor S2 and a resistor R6.

When the voltage across measuring winding Tr4 exceeds the Zener voltage of Zener diode Z1, a base current flows into auxiliary transistor S3, causing the auxiliary transistor to enter a conductive state. Auxiliary transistor S3 functions as an amplifier and inverter for the control variations. When auxiliary transistor S3 is in a conductive state, the voltage at the base terminal control transistor S2 decreases so as to cause control transistor S2 to enter a nonconductive state, thereby permitting capacitor C1 to be charged to a higher voltage. The resulting reduction in the base-emitter voltage of switching transistor S1 causes the above-described variations in the duty cycle of the switching transistor, and the corresponding control of the output voltage of the converter.

Although the inventive concept disclosed herein is described in terms of specific embodiments and particular applications, persons skilled in the pertinent art can generate additional embodiments without departing from the spirit or exceeding the scope of the claimed invention. It is to be remembered, therefore, that the drawings and descriptions in this disclosure are illustrative of the invention and should not construed to limit the scope thereof.

What is claimed is:

1. A free-running blocking oscillator-type converter of the type having a switching transistor in series with a primary winding of a transformer, the transformer having a secondary winding connected in series with a rectifier, and with a smoothing filter between first and second output terminals of the converter, the transformer further having a feedback winding which is coupled to a base terminal of the switching transistor, the converter further comprising:

first resistor means, diode means, and capacitor means, connected in series with one another between the first and second input terminals of the converter, said first resistor means and said diode means being coupled to one another at a first node, said first node being further connected to the base terminal of the switching transistor, said diode means and said capacitor means being coupled to one another at a second node;

sensor means for detecting variations in a voltage across the first and second output terminals, said sensor means being coupled to said second node; and second resistor means for coupling the switching transistor to said second input terminal of the converter.

2. A free-running blocking oscillator-type converter of the type having a switching transistor in series with a primary winding of a transformer, the transformer having a secondary winding connected in series with a rectifier, and with a smoothing filter between first and second output terminals of the converter, the transformer further having a feedback winding which is coupled to a base terminal of the switching transistor, the converter further comprising:

capacitor means, resistor means, and control transistor means connected in an electrically parallel combination, the parallel combination being electrically disposed between the switching transistor and the second input terminal of the converter; and sensor means for detecting variations in an output voltage of the converter, said sensor means being connected to a base terminal of said control transistor means for controlling a charge stored in said capacitor means.

3. The free-running blocking oscillator-type converter of claim 1 or 2 wherein said sensor means further comprises Zener diode means and optoelectronic coupling device diode means connected in series with one another between the output terminals of the converter, and optoelectronic coupling device transistor means having collector and emitter terminals for providing a sensor output signal.

4. The free-running blocking oscillator-type converter of claim 1 or 2 wherein said sensor means further comprises;

measuring winding means in the transformer for producing a signal responsive to variations in a voltage across the output terminals of the converter;

threshold detector means having a rectifier diode, Zener diode, and a resistor in series with one another; and auxiliary transistor means having collector and emitter terminals for providing a sensor output signal, and a base terminal connected to a junction point of said Zener diode and said resistor in said threshold detector means.

5. The free-running blocking oscillator-type converter of claim 1 wherein there is further provided a shunt resistance connected electrically parallel with said capacitor means.

6. The free-running blocking oscillator-type converter of claim 1 or 2 wherein there is further provided amplifier means connected to said sensor means.

7. The free-running blocking oscillator-type converter of claim 1 or 2 wherein there is further provided Zener diode voltage limiter means for limiting a voltage at said base terminal of the switching transistor, with respect to a voltage on the second input terminal of the converter.

* * * * *